United States Patent [19]

Young

[11] Patent Number: 4,644,862

[45] Date of Patent: Feb. 24, 1987

[54] ADJUSTING APPARATUS FOR BALER PACKER ASSEMBLY

[75] Inventor: Robert G. Young, Bird-in-Hand, Pa.

[73] Assignee: New Holland Inc., New Holland, Pa.

[21] Appl. No.: 835,680

[22] Filed: Mar. 3, 1986

[51] Int. Cl.[4] .................. B30B 1/26; A01D 89/00
[52] U.S. Cl. ................................. 100/189; 56/341
[58] Field of Search .............. 100/100, 189, 295; 56/341

[56] References Cited

U.S. PATENT DOCUMENTS

| | | | |
|---|---|---|---|
| 2,409,478 | 10/1946 | Dickow | 100/25 |
| 2,450,082 | 9/1948 | Crumb et al. | 100/25 |
| 3,602,365 | 8/1971 | Fisher et al. | 100/189 X |
| 4,409,891 | 10/1983 | Naaktgeboren | 100/189 |
| 4,525,991 | 7/1985 | Naaktgeboren | 100/189 X |
| 4,569,282 | 2/1986 | Galant | 100/189 |

*Primary Examiner*—Louis K. Rimrodt

*Attorney, Agent, or Firm*—Darrell F. Marquette; Frank A. Seemar; Larry W. Miller

[57] ABSTRACT

Apparatus is disclosed for adjusting the packer assembly of an agricultural baler. The apparatus includes a control link or rod having one end thereof connected to a trunnion which is rotatably mounted between the forks of the packer assembly. A support member or clevis rotatably supports another trunnion that is connected to the other end of the control link. An adjusting device or knob is connected to the support member by a screw to move the support member to different positions in order to adjust the penetration of the packer forms into the bale case of the baler. An important feature of the disclosed apparatus is that the adjusting device or knob remains stationary relative to the bale case of the baler during movement of the packer forks. This feature facilitates adjustment of the packer assembly when the baler is operating.

11 Claims, 2 Drawing Figures

ADJUSTING APPARATUS FOR BALER PACKER ASSEMBLY

BACKGROUND OF THE INVENTION

This invention relates generally to agricultural balers and, in particular, to an improved adjusting apparatus for the packer assembly on such balers.

Typically, agricultural balers have included a bale chamber, a feed chamber located adjacent the bale chamber, a packer assembly for feeding crop material from the feed chamber into the bale chamber, and a plunger reciprocating in the bale chamber for compressing the crop material fed in by the packer assembly. The packer assembly is usually adjustable in order to correct bale shape problems.

U.S. Pat. No. 3,602,365 discloses a mechanism for adjusting a packer assembly. The disclosed adjusting mechanism includes a control link which is threaded at one end for engagement with a trunnion extending between a pair of spaced arms that are connected to the forks of the packer assembly. The other end of the control link is journalled in another trunnion carried on the baler frame, and includes a handle and crank for turning the control link. In order to adjust the penetration of the packer forks into the bale case, the handle and crank are turned in the desired direction to either increase or decrease the effective length of the control link, i.e., the distance between the trunnions. A drawback of the adjusting mechanism disclosed in U.S. Pat. No. 3,602,365 is that the handle and crank are constantly moving up and down with the control link when the baler is operating thereby making adjustment of the packer assembly difficult unless the baler is stopped.

The present invention overcomes this drawback by providing an improved adjusting apparatus which permits easy adjustment of a packer assembly while a baler is operating or when it is stopped.

SUMMARY OF THE INVENTION

The improved adjusting apparatus provided by the present invention is intended for use on an agricultural baler having a bale case, a feed chamber adjacent the bale case, and a packer assembly for delivering crop material from the feed chamber into the bale case. The packer assembly includes a fork movable so that its tip follows a predetermined path through the feed chamber and the bale case.

The adjusting apparatus comprises a control link such as a rod having one end rotatably connected to the fork, support means such as a clevis rotatably supporting the other end of the control link, and adjusting means such as a knob connected to the support means for moving the support means to different positions in order to adjust the position of the predetermined fork tip path with respect to the bale case. The adjusting means moves the support means in one direction to increase the penetration of the predetermined fork tip path into the bale case and in another direction to decrease the penetration of the predetermined fork tip path into the bale case. The adjusting means remains stationary relative to the bale case during movement of the fork to facilitate adjustment of the packer assembly when the baler is operating.

DESCRIPTION OF THE INVENTION

Figure 1:
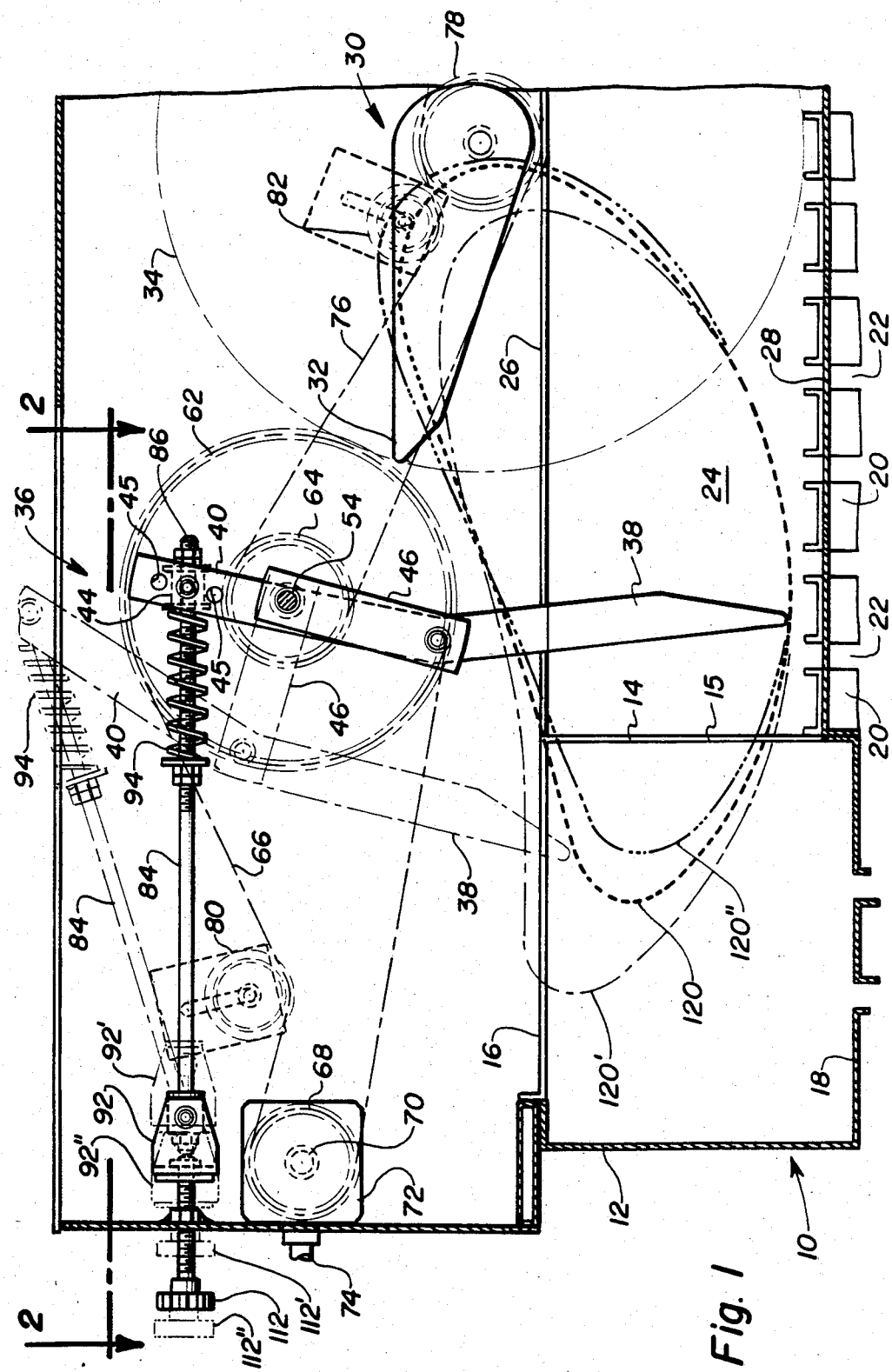
FIG. 1 is a sectional view of a portion of an agricultural baler showing a packer assembly and the preferred embodiment of an adjusting device according to the present invention.
Figure 2:
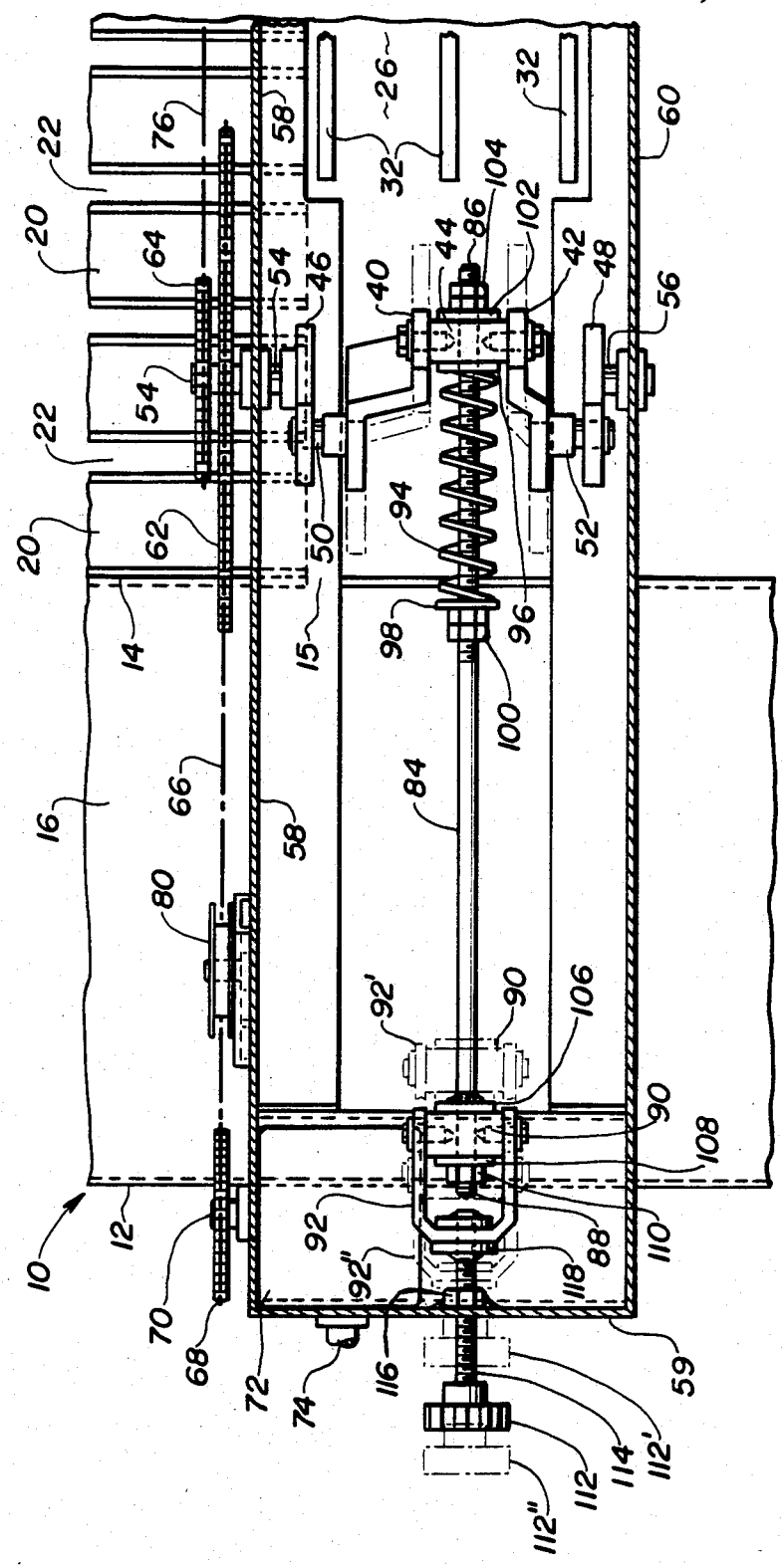
FIG. 2 is an enlarged sectional view taken along lines 2—2 in FIG. 1.

Referring to FIGS. 1 and 2, an agricultural baler includes a bale case 10 having an outer sidewall 12, an inner sidewall 14, a top wall 16 and a bottom wall 18. A plunger (not shown) is mounted in the bale case 10 for reciprocating movement in a known manner. Stripper plates 20 are spaced apart to form slots 22 for receiving the fingers of a conventional pickup mechanism (not shown). A feed chamber 24 is defined adjacent the bale case 10 by upper and lower panels 26 and 28, respectively.

A rotary feeder unit 30 including forks 32 moves crop material delivered into the feed chamber 24 by the pickup mechanism toward the bale case 10. The tips of the forks 32 follow a circular path designated 34 in FIG. 1. The rotary feeder unit 30 may include further sets of forks 32 depending upon the width of the feed chamber 24.

A packer assembly 36 includes a pair of forks 38 rigidly connected to a pair of links 40 and 42 which are joined together at their upper ends by a trunnion 44. The trunnion 44 is rotatably mounted between the links 40,42 in any of several locations defined by holes 45 formed in the links 40,42. Crank arms 46 and 48 are connected to the links 40 and 42, respectively, by stub shaft members 50 and 52, respectively. The crank arms 46 and 48 are fixed to crank shafts 54 and 56, respectively, which are rotatably mounted in suitable bearings carried in support plates 58 and 60.

A large sprocket 62 and a small sprocket 64 are fixed on the crank shaft 54, and a chain 66 connects the large sprocket 62 to another small sprocket 68 fixed to the output shaft 70 of a gearbox 72. The gearbox 72 also has an input shaft 74 which may be connected to a power source such as the PTO of a tractor. Another chain 76 connects the small sprocket 64 to a further small sprocket 78 for rotating the forks 32 of the rotary feeder unit 30. Idler wheels 80,82 are provided to maintain proper tension in the chains 66,76.

The adjusting apparatus of the present invention includes a control link such as rod 84 having one end 86 thereof slidably extending through a transverse hole in the trunnion 44. The other end 88 of the rod 84 slidably extends through a transverse hole in another trunnion 90 which is rotatably mounted in a support member such as a clevis 92. A relief spring 94 is disposed on the rod 84 and is maintained in compression between a washer 96 abutting the trunnion 44 and another washer 98 abutting a nut and locknut combination 100 threaded onto the rod 84. A further washer 102 abuts the other side of the trunnion 44 opposite the washer 96 and is held in position by another nut and locknut combination 104 threaded onto the end 86 of the rod 84. The trunnion 90 is clamped between a washer 106 welded to the rod 84 and a washer 108 held in position on the end 88 of the rod 84 by a nut 110.

An adjusting device includes a knob 112 secured to one end of a screw 114. The screw 114 extends freely through a hole in the panel 59 and is threadably engaged with a nut 116 welded to the inside of the panel 59. The other end of the screw 114 opposite the knob 112 is fixed to a fitting 118 carried by the clevis 92.

When the baler is operating to form bales in the bale case 10 with the knob 112 and the clevis 92 in the positions shown in full lines in FIGS. 1 and 2, the forks 38 of the packer assembly 36 oscillate back and forth with the tips of the forks 38 following a substantially kidney-shaped predetermined path designated 120 in FIG. 1. It will be understood that the forks 38 take over crop material from the forks 32 of the rotary feeder unit 30 and deliver it through a feed opening 15 formed in the inner sidewall 14 of the bale case 10. The forks 38 pass through slots formed in the top wall 16 of the bale case 10 and through slots formed in the upper panel 26 of the feed chamber 24. Should the forks 38 become overloaded by encountering an obstruction such as a wad of crop material while moving through the feed chamber 24 or the bale case 10, the relief spring 94 will permit the forks 38 to move backward since the trunnion 44 may move along the rod 84 in a direction (toward the left in FIGS. 1 and 2) compressing the spring 94.

If the operator desires to adjust the position of the fork tip path 120 so that the forks 38 penetrate farther into the bale case 10, the knob 112 is turned in a direction which causes movement of the clevis 92 toward the phantom position 92' while the knob 112 is moved toward the phantom position 112'. Such movement of the clevis 92 and the attached trunnion 90 causes corresponding movement of the trunnion 44 toward the right in FIGS. 1 and 2 due to the rod 84. This moves the fork tip path 120 toward the position designated 120' in FIG. 1.

Conversely, if the operator desires to adjust the position of the fork tip path 120 in a manner to reduce the penetration of the forks 38 into the bale case 10, the knob 112 is turned in a direction which causes movement of the clevis 92 toward the phantom position 92" while the knob 112 is moved toward the phantom position 112". Such movement of the clevis 92 and the attached trunnion 90 causes corresponding movement of the trunnion 44 toward the left in FIGS. 1 and 2 due to the rod 84. This moves the fork tip path 120 toward the position designated 120" in FIG. 1.

An important advantage of the present invention is that the knob 112, the screw 114 and the clevis 92 remain stationary relative to the bale case 10 during the oscillating movement of the forks 38. This permits easy adjustment of the packer assembly 36 when the baler is operating.

Another important advantage of the present invention is that the adjusting knob 112, the screw 114 and the clevis 92 are isolated from the force of the relief spring 94. This provides for ease of adjustment of the packer assembly 36 since the knob 112 may be turned with minimal effort.

The following claims are intended to cover all modifications and variations of the preferred embodiment of the invention disclosed herein.

Having thus described the invention, what is claimed is:

1. In an agricultural baler having a bale case, a feed chamber adjacent said bale case, a packer assembly for delivering crop material from said feed chamber into said bale case, said packer assembly including a fork movable so that its tip follows a predetermined path through portions of said feed chamber and said bale case, apparatus for adjusting the position of said predetermined path with respect to said bale case, said apparatus comprising:
   a control link having one end thereof rotatably connected to said fork;
   support means rotatably supporting the other end of said control link; and
   adjusting means connected to said support means for moving said support means to different positions in order to adjust the position of said predetermined path with respect to said bale case.

2. The apparatus of claim 1, wherein said adjusting means moves said support means in one direction of increase the penetration of said predetermined path into said bale case and in another direction to decrease the penetration of said predetermined path into said bale case.

3. The apparatus of claim 2, wherein said support means comprises a clevis and said adjusting means comprises a knob connected to said clevis.

4. The apparatus of claim 3, wherein said one end of said control link is connected to a first trunnion which is rotatably connected to said fork and wherein said other end of said control link is connected to a second trunnion which is rotatably supported by said clevis.

5. The apparatus of claim 4, wherein said control link comprises a rod extending between said first and second trunnions.

6. The apparatus of claim 5, wherein said adjusting means further comprises a screw secured at one end to said knob and fixed at the other end to said clevis independently of said second trunnion.

7. The apparatus of claim 6, further comprising a spring disposed on said rod, and said first trunnion being movable along said rod against the force of said spring and toward said second trunnion whenever said fork becomes overloaded during its movement.

8. The apparatus of claim 7, wherein said knob, said screw and said clevis remain stationary relative to said bale case during movement of said fork thereby facilitating adjustment of said packer assembly when the baler is operating.

9. The apparatus of claim 7, wherein said knob, said screw and said clevis are isolated from the force of said spring thereby facilitating adjustment of said packer assembly.

10. The apparatus of claim 1, wherein said adjusting means remains stationary relative to said bale case during movement of said fork to facilitate adjustment of said packer assembly when the baler is operating.

11. The apparatus of claim 10, wherein said support means also remains stationary relative to said bale case during movement of said fork.

* * * * *